United States Patent
Gráwe et al.

(10) Patent No.: US 7,479,293 B2
(45) Date of Patent: Jan. 20, 2009

(54) DEGRADABLE CHEWING GUM BASES AND METHOD OF MAKING

(75) Inventors: René Gráwe, Burghausen (DE); Thomas Wimmer, Burghausen (DE)

(73) Assignee: Wacker Chemie AG, Munich (DE)

( * ) Notice: Subject to any disclaimer, the term of this patent is extended or adjusted under 35 U.S.C. 154(b) by 197 days.

(21) Appl. No.: 11/176,604

(22) Filed: Jul. 7, 2005

(65) Prior Publication Data

US 2006/0182845 A1    Aug. 17, 2006

(30) Foreign Application Priority Data

Feb. 17, 2005   (EP) .................................. 05003438

(51) Int. Cl.
*A23G 4/08*   (2006.01)

(52) U.S. Cl. .......................................................... 426/3

(58) Field of Classification Search ...................... 426/3
See application file for complete search history.

(56) References Cited

U.S. PATENT DOCUMENTS 5,242,880 A    9/1993   Irick, Jr.
5,366,740 A    11/1994  Shaw et al.
6,599,542 B1   7/2003   Abdel-Malik et al.

FOREIGN PATENT DOCUMENTS

| EP | 0 711 506     | 5/1996  |
|----|---------------|---------|
| JP | 05-276871     | 10/1998 |
| JP | 2000-229618   | 8/2000  |
| JP | 2002-142672   | 5/2005  |
| WO | WO 02/076232  | 10/2002 |

OTHER PUBLICATIONS

Derwent Abstract corresponding to JP-A 02 24 264 0 [AN 1990-338057].
English Abstract corresponding to JP 05-276871.
English Abstract corresponding to JP 2002-14672.
English Abstract corresponding to JP 2000-229618.

*Primary Examiner*—Arthur L Corbin
(74) *Attorney, Agent, or Firm*—Brooks Kushman P.C.

(57) ABSTRACT

The invention relates to degradable chewing gum bases comprising elastomer, polymer resin, filler and further additives, in which the filler portion is entirely or partially replaced by an photoactive filler.

6 Claims, No Drawings

DEGRADABLE CHEWING GUM BASES AND METHOD OF MAKING

BACKGROUND OF THE INVENTION

1. Field of the Invention

The invention relates to degradable chewing gum bases to a method for their production.

2. Description of the Related Art

A big problem in the use of chewing gum is the fact that, after use, the chewing gum is often not disposed of in an environmentally compatible manner in waste bins or wastepaper baskets, but is carelessly deposited onto footpaths and the like. Chewing gum disposed of in this manner binds dust on account of its stickiness, becomes stained black, and forms unsightly black marks. The synthetic-polymer-based chewing gum bases currently manufactured do not decompose significantly ("rot") under customary climatic conditions and also cannot be removed using customary street cleaning methods.

A long-felt need has existed, therefore, either for modifying the chewing gum bases in such a manner that they become more easily removed (easily removable gum base) or to modify the chewing gum bases in such a manner that they are chemically degradable (biodegradable gum base). From the prior art it is known to modify the chewing gum bases with polyesters to promote biodegradability, as disclosed, for example, in published applications EP A 711506 and WO A 02/76232. In U.S. Pat. No. 6,599,542, to promote biodegradability, the chewing gum base is modified with proteins. In U.S. Pat. No. 5,366,740, gluten is added to the chewing gum base to improve biodegradability.

These proposed solutions to biodegradability are disadvantageous in that these types of additives are not usually present in chewing gum bases and thus require a change in the formulation. Furthermore, adverse effects with respect to flavor and chewing properties can occur due to their use.

SUMMARY OF THE INVENTION

An object of the present invention was therefore to modify chewing gum bases in such a manner that their degradability is promoted without the aforementioned adverse accompanying phenomena. This and other objects are surprisingly and unexpectedly met by degradable chewing gum bases comprising elastomer, polymer resin, filler and further additives in which the filler portion is entirely or partially replaced by a photoactive filler which induces decomposition of organic molecules upon exposure to UV light.

DETAILED DESCRIPTION OF THE PREFERRED EMBODIMENT(S)

As indicated previously, photoactive fillers here are taken to mean fillers which induce the decomposition of organic molecules under UV irradiation, for example by means of photocatalysis, and thus promote the degradation of the elastomer and polymer portion of the chewing gum base.

A preferred photoactive filler is titanium dioxide in the anatase modification. Particular preference is given to nano-anatase, which is anatase preferably having a particle size of 2 nm to 15 nm.

Suitable elastomers for chewing gum bases are polyisobutylenes, isobutylerie-isoprene copolymers, styrene-butadiene copolymers and also natural rubber. The elastomer portion generally constitutes about 10 to 50% by weight, based on the total weight of the chewing gum base.

Examples of polymer resins are poly(vinyl acetate), vinyl acetate-vinyl laurate copolymers and also ethylene-vinyl acetate copolymers. The proportion of polymer resin is generally 10 to 60% by weight, based on the total weight of the chewing gum base.

Suitable fillers include magnesium carbonate, calcium carbonate, magnesium silicates, aluminum silicates, talc, titanium dioxide (ratile), calcium phosphate and also cellulose ether. The proportion of filler in the formulation is generally 10 to 40% by weight, based on the total weight of the chewing gum base.

The filler portion is, according to the invention entirely or partially replaced by photoactive fillers. Preferably, the filler portion is partially replaced by photoactive fillers. Most preferably, the proportion of photoactive fillers is 1 to 20% by weight, most preferably 5 to 15% by weight, based on the total weight of the chewing gum base.

Further additives are waxes such as paraffin wax or polyethylene wax, plasticizers such as colophony resins or terpene resins, hardened fats or glycerol triacetate, antioxidants, flavorings and colorants. The amounts of these additives used are known to those skilled in the art and are preferably the conventionally used amounts. Note that the percentages by weight of the constituents of the chewing gum base in the formula add up to 100% by weight in each case.

Chewing gum bases may be produced using customary methods. Generally, the constituents of the chewing gum base, if appropriate after an upstream granulation or pulverization step, are mixed, then the mixture is heated, generally to 70° C. to 150° C., and generally up to its melting or softening point, and then the chewing gum base is then extruded or cast into a mold.

The examples hereinafter illustrate the invention, but do not limits its scope in any way. Chewing gum bases of the following composition were produced:

Comparative Example 1

| Constituents | | in % by weight |
| --- | --- | --- |
| 1 Elastomer | Isobutylene/isoprene-copolymer (Exxon Butyl 007) | 7.6 |
| 2 Elastomer | Polyisobutylene (Vistanex ™ M03399) | 5.4 |
| 3 Polymer resin | Poly(vinyl acetate) (Vinnapas ™ B 1.5sp) | 27.2 |
| 4 Filler | Calcium carbonate (Omycarb ™ 4 BG) | 25.0 |
| 5 Plasticizer | Colophony (DG Dertopoline ™ CG) | 19.6 |
| 6 Wax | Paraffin (TerHell ™ 2528) | 9.8 |
| 7 Softener | Glycerol triacetate (Cognis Edenor ™ GTA) | 5.4 |
| Total: | | 100.0 |

Constituents 1, 2 and 4 were homogeneously kneaded at 120° C. and, after addition of constituent 3, the temperature reduced to 100° C. Then, constituent 5 was kneaded in homogeneously, following which components 6 and 7 were also kneaded in homogeneously at 100° C. The kneading time was, in total, 1.5 hours. The same ingredients, with the exception of filler, were used in subject invention Examples 2-5, as follows:

Example 2

| Constituents | | in % by weight |
|---|---|---|
| 1 Elastomer | Isobutylene/isoprene-copolymer | 7.6 |
| 2 Elastomer | Polyisobutylene | 5.4 |
| 3 Polymer resin | Poly(vinyl acetate) | 27.2 |
| 4 Filler | Calcium carbonate | 20.0 |
| 4 Filler | Nano-anatase (Hombikat UV 100) | 5.0 |
| 5 Plasticizer | Colophony | 19.6 |
| 6 Wax | Paraffin | 9.8 |
| 7 Softener | Glycerol triacetate | 5.4 |
| Total: | | 100.0 |

The chewing gum base was produced in a similar manner to comparative example 1.

Example 3

| Constituents | | in % by weight |
|---|---|---|
| 1 Elastomer | Isobutylene/isoprene-copolymer | 7.6 |
| 2 Elastomer | Polyisobutylene | 5.4 |
| 3 Polymer resin | Poly(vinyl acetate) | 27.2 |
| 4 Filler | Calcium carbonate | 15.0 |
| 4 Filler | Nano-anatase | 10.0 |
| 5 Plasticizer | Colophony | 19.6 |
| 6 Wax | Paraffin | 9.8 |
| 7 Softener | Glycerol triacetate | 5.4 |
| Total: | | 100.0 |

The chewing gum base was produced in a similar manner to comparative example 1.

Example 4

| Constituents | | in % by weight |
|---|---|---|
| 1 Elastomer | Isobutylene/isoprene-copolymer | 7.6 |
| 2 Elastomer | Polyisobutylene | 5.4 |
| 3 Polymer resin | Poly(vinyl acetate) | 27.2 |
| 4 Filler | Calcium carbonate | 20.0 |
| 4 Filler | Anatase (Hombitan) | 5.0 |
| 5 Plasticizer | Colophony | 19.6 |
| 6 Wax | Paraffin | 9.8 |
| 7 Softener | Glycerol triacetate | 5.4 |
| Total: | | 100.0 |

The chewing gum base was produced in a similar manner to comparative example 1.

Example 5

| Constituents | | in % by weight |
|---|---|---|
| 1 Elastomer | Isobutylene/isoprene-copolymer | 7.6 |
| 2 Elastomer | Polyisobutylene | 5.4 |
| 3 Polymer resin | Poly(vinyl acetate) | 27.2 |
| 4 Filler | Calcium carbonate | 15.0 |
| 4 Filler | Anatase (Hombitan) | 10.0 |
| 5 Plasticizer | Colophony | 19.6 |
| 6 Wax | Paraffin | 9.8 |
| 7 Softener | Glycerol triacetate | 5.4 |
| Total: | | 100.0 |

The chewing gum base was produced in a similar manner to comparative example 1.

In order to test the degradability of the chewing gum bases from the foregoing examples, the chewing gum bases were rolled out to form 2 mm-thick slabs and were then stuck onto metal plates of dimensions 6 cm×20 cm. Weathering was tested in a manner similar to DIN EN ISO 4892, in which a cycle was run in which wetting for 2 hours at 40° C. alternated with 6 h of illumination by Q-UVB at 45° C. In total, the cycle was run until an illumination period of 2500 hours had been achieved.

The degradation of the chewing gum bases is accompanied by increasing chalking of the surface. Therefore, the chalking of the surfaces of the test slabs was determined visually in each case before weathering and after weathering and qualitatively assessed on a scale from 1 to 6, where 1 corresponds to severe chalking and 6 corresponds to no chalking.

The results are summarized in Table 1:

| Example | Chalking before weathering | Chalking after weathering |
|---|---|---|
| Comparative example 1 | 6 | 6 |
| Example 2 | 6 | 3 |
| Example 3 | 6 | 1 |
| Example 4 | 6 | 4 |
| Example 5 | 6 | 2 |

The test results show that without photoactive fillers, no breakdown of the chewing gum base occurs (comparative example 1). In the chewing gum bases modified by anatase, there was distinct chalking, that is distinct breakdown of the chewing gum base was observable. The best results, based on the weight of photoactive filler employed, were obtained using nano-anatase (Examples 2 and 3).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A degradable chewing gum base comprising elastomer, polymer resin, titanium dioxide in the anatase modification in an amount sufficient to promote degradation of the elastomer and the polymer resin, and further additives.

2. The degradable chewing gum base of claim 1, wherein the the titanium dioxide comprises nano-anatase.

3. The degradable chewing gum base of claim 2, wherein the proportion of the titanium dioxide is 1 to 20% by weight, based on the total weight of the chewing gum base.

4. The degradable chewing gum base of claim 1, wherein the proportion of the titanium dioxide is 1 to 20% by weight, based on the total weight of the chewing gum base.

5. The degradable chewing gum base of claim 1, wherein the proportion of the titanium dioxide is 1 to 20% by weight, based on the total weight of the chewing gum base.

6. A method of producing a degradable chewing gum base of claim 1, comprising mixing the constituents of the chewing gum base, optionally after an upstream granulation or pulverization step, heating the mixture, and extruding the chewing gum base or casting the chewing gum base in a mold.

* * * * *